United States Patent [19]
Shirahata

[11] Patent Number: 4,707,531
[45] Date of Patent: Nov. 17, 1987

[54] METHOD FOR PRODUCING ORGANOSILICON POLYMERS AND THE POLYMERS PREPARED THEREBY

[75] Inventor: Akihiko Shirahata, Chiba, Japan

[73] Assignee: Toray Silicone Co., Ltd., Tokyo, Japan

[21] Appl. No.: 921,976

[22] Filed: Oct. 22, 1986

Related U.S. Application Data

[63] Continuation-in-part of Ser. No. 831,235, Feb. 18, 1986, abandoned.

[30] Foreign Application Priority Data

Feb. 22, 1985 [JP] Japan .................................. 60-35146

[51] Int. Cl.$^4$ .............................................. C08G 77/06
[52] U.S. Cl. ..................................... 528/12; 556/450; 556/453; 556/455; 556/456; 556/462
[58] Field of Search .................. 528/12; 556/450, 453, 556/455, 456, 462

[56] References Cited

U.S. PATENT DOCUMENTS

| 2,676,182 | 4/1954 | Daudt et al. ..................... 260/448.2 |
| 2,814,601 | 11/1957 | Currie et al. ...................... 260/29.1 |
| 2,857,356 | 10/1958 | Goodwin ............................. 260/42 |
| 3,389,114 | 6/1968 | Burzynski et al. ................. 260/32.8 |
| 3,629,358 | 12/1971 | Lamoreaux et al. ................... 528/39 |
| 4,269,757 | 5/1981 | Mine et al. ............................. 528/39 |
| 4,539,232 | 9/1985 | Burzynski et al. .................. 427/387 |

Primary Examiner—Melvyn I. Marquis
Attorney, Agent, or Firm—Roger H. Borrousch

[57] ABSTRACT

The method of dripping an alkyl silicate into a mixture of an aqueous hydrochloric acid which contains at least 5 weight percent hydrogen chloride and a trialkylsilane or a disiloxane at a temperature of from 0° to 90° C. is a highly reproducible method for producing a three-dimensional structure of monofunctional siloxane units and tetrafunctional siloxane units. The organosilicon polymers produced are useful as tack agents, coating agents, and as additives in other compositions.

27 Claims, No Drawings

METHOD FOR PRODUCING ORGANOSILICON POLYMERS AND THE POLYMERS PREPARED THEREBY

This application is a continuation-in-part of Ser. No. 831,235, filed Feb. 18, 1986 now abandoned.

BACKGROUND OF THE INVENTION

1. Field of the Invention

The present invention relates a method for producing organosilicon polymer composed of a monofunctional component in the form of $R_3SiO_{\frac{1}{2}}$ units and a tetrafunctional component in the form of the $SiO_{4/2}$ unit. More specifically, the present invention relates a method for producing said polymer wherein the average molecular weight can be freely adjusted. This invention also relates to the composition produced by the method.

2. Prior Art Technologies and Their Drawbacks Requiring Solution

Organosilicon polymers composed of monofunctional siloxane units and tetrafunctional siloxane units have been known for some time and are currently employed in a broad range of applications. In a typical known method for producing said polymer, a water-soluble silicate salt such as water glass or sodium orthosilicate is converted into silicic acid monomer or silicic acid oligomer using hydrochloric or sulfuric acid and then trapped with trimethylchlorosilane, etc., after an appropriate polymerization as described by Daubt et al. in U.S. Pat. No. 2,676,182, issued Apr. 20, 1954 and by Currie et al. in U.S. Pat. No. 2,814,601, issued Nov. 26, 1957; alternatively, water is added to the mixture of an alkyl silicate and a hydrolyzable trialkylsilane and this cohydrolyzed as described by Goodwin in U.S. Pat. No. 2,857,356, issued Oct. 21, 1958.

This first method accrues the drawback of poor control of the rate of silicic acid polymerization which makes it impossible to produce organosilicon polymer with an arbitrary, desired molecular weight. In addition, the first method accrues the additional drawback that the produced silicic acid tends to polymerize with gelation since the alkali silicate salt must be neutralized with acid and the system then acidified because silicic acid is least stable at a pH of about 7. Furthermore, the first method suffers the drawback that the polymer product has a broad molecular weight distribution from low to high molecular weights.

On the other hand, the second method is a quite common method for synthesizing multicomponent organosilicon polymers in which hydrolyzable silanes with hydrolysis rates which are not significantly different are first mixed and then combined and cohydrolyzed with water. This method uses ethyl orthosilicate, ethyl polysilicate, methyl orthosilicate or methyl polysilicate as the alkyl silicate and typically uses trimethylchlorosilane as the hydrolyzable trialkylsilane. This method seeks to provide the unambiguous specification of the monofunctional siloxane unit/tetrafunctional siloxane unit ratio in the organosilicon polymer product by varying the molar ratio of the different hydrolyzable silanes which are first mixed with each other. However, in this method, alkoxy groups tend to remain at sterically complex sites in the organosilicon polymer product due to incomplete hydrolysis of alkoxy groups during the hydrolysis and condensation reactions of the alkyl silicate. This phenomenon even occurs with the use of a silicate with readily hydrolyzable alkoxy groups as the starting material, for example, methyl orthosilicate. A silicate with readily hydrolyzable alkoxy groups rapidly condenses with its partial hydrolyzate and a portion of the alkoxy groups remains unreacted and confined in the polymer and does not participate in the reaction. For this reason, this method necessarily accrues the drawback that the molecular structure and molecular weight of the polymer product differ significantly from those calculated from the charged monofunctional component/tetrafunctional component ratio.

Another method for making resinous copolymers is described by Lamoreaux et al. in U.S. Pat. No. 3,629,358, issued Dec. 21, 1971. The method taught by Lamoreaux et al. is complex involving hydrolysis of trimethylchlorosilane in the presence of ether with ammonium hydroxide; separating the layers; adding tetrachlorosilane, toluene, and methanol to the ether-silane layer; adding water to hydrolyze; and then recovering in the toluene layer a copolymer containing trimethylsiloxy units and $SiO_2$ units. Such complex methods do not provide routes to predetermined molecular structures.

Mine et al. in U.S. Pat. No. 4,269,757, issued May 26, 1981, broadly teach resinous copolymers containing triorganosiloxy units and $SiO_2$ units. The examples of Mine et al. show copolymers containing substantial amounts of alkoxy functional siloxane units, such as 12 mol % $CH_2=CH(CH_3O)_2SiO_{0.5}$ units. Copolymers which contain large amounts of such alkoxy containing siloxane units would need to be made by some special technique or method. The patent of Mine et al. is an example of certain types of resinous copolymers, but only suggest their preparation by earlier methods, namely cohydrolysis.

SUMMARY OF THE INVENTION

Method for Solving the Drawbacks and Effects of the Method

The goal of the present invention is to eliminate the above-mentioned drawbacks by providing a method for producing organosilicon polymer which is composed of monofunctional siloxane units and tetrafunctional siloxane units, which has a narrow molecular weight distribution and whose average molecular weight can be freely adjusted merely by varying the charged (monofunctional organosilicon compound)/(tetrafunctional alkyl silicate) ratio, in particular, in practical applications merely by varying the quantity of alkyl silicate to be dripped in.

This invention relates to a method for producing organosilicon polymer having a general average formula

in which each $R^1$, $R^2$, and $R^3$ is a hydrogen atom or a monovalent hydrocarbon radical and the ratio of a/b is from 0.2/1 to about 4/1 comprising dripping an alkyl silicate selected from the group consisting of alkyl orthosilicate and its partial hydrolysis condensate into a mixture of aqueous hydrochloric acid containing at least 5 weight percent hydrogen chloride and an organosilicon compound selected from the group consisting of a disiloxane of the formula

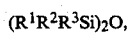

an organosilane of the formula $R^1R^2R^3SiX$, and mixtures thereof in which $R^1$, $R^2$, and $R^3$ are defined above and X is a group selected from the group consisting of a halogen atom, an alkoxy group, and a hydroxyl group at a temperature of 0° to 90° C. with stirring.

DESCRIPTION OF THE PREFERRED EMBODIMENTS

In the present invention, equilibrium reactions, such as disiloxane dissociation and bonding reactions and the bonding and dissociation reactions between silicate and trialkylsiloxy groups, the alkyl silicate hydrolysis reaction, and nonequilibrium reactions such as siloxane bonding between silicates are combined in a complex manner, as will be discussed below; however, the molecular weight of the target organosilicon polymer can be unambiguously specified by varying the quantity of alkyl silicate to be dripped in.

One equilibrium reaction comprises the dissociation reaction in which disiloxane is hydrolyzed into two silanol-containing silane molecules and the synthesis reaction in which these two silane molecules bond to each other to give the disiloxane. This equilibrium reaction occurs under specific acidic conditions and prevents the condensation of alkyl silicate with itself because the silane monomer produced by the dissociation reaction traps the silanol produced by hydrolysis of the added alkyl silicate. The new bond produced in this process is a siloxane bond between the silicate and a trialkylsiloxy group and this bond also participates in a dissociation/condensation equilibrium reaction under specific acidic conditions. Due to this, when an alkyl silicate is dripped into the mixture of a specific acidic aqueous solution and a disiloxane, the siloxane oligomer produced in the initial stage of the reaction is a trialkylsilyl orthosilicate for the use of, for example, ethyl orthosilicate, as the alkyl silicate. As ethyl orthosilicate continues to be dripped in, the silicate moiety produced during addition is inserted into the siloxane bond between the trialkylsiloxy group and silicate of the trialkylsilyl orthosilicate to produce a new siloxane bond. The silicate-silicate siloxane bond undergoes little dissociation under acidic conditions and this reaction is thus a non-equilibrium reaction. Polysilicate forms the nucleus of the target organosilicon polymer molecule which, as a result, has a molecular structure whose surface is covered with trialkylsiloxy groups. As ethyl orthosilicate continues to be dripped in, the silicate produced from the added ethyl orthosilicate is inserted into the equilibrated siloxane bond between the trialkylsiloxy group and the nucleus-forming silicate, thus increasing the molecular weight of the organosilicon polymer.

Thus, the preceding reaction is characterized by the ability to specify in an unambiguous manner the molecular weight of the target organosilicon polymer by the quantity of alkyl silicate dripped into a prescribed quantity of disiloxane. The addition of a specified quantity of alkyl silicate will produce a polymer with a particular average molecular weight. As addition of the alkyl silicate continues, a polymer is produced wherein the increase in its average molecular weight is proportional to the additional quantity of alkyl silicate dripped in.

The aqueous hydrochloric acid solution in the reaction system must contain at least 5 wt % hydrogen chloride and, in particular, the use of an aqueous hydrochloric acid solution which contains at least 10 wt % hydrogen chloride is preferred. When said quantity of hydrogen chloride is less than 5 wt %, the disiloxane scission reaction is slow with the result that condensation of alkyl silicate alone proceeds preferentially and a large quantity of gel is produced. Also, the quantity of water is determined by the condition that said quantity is sufficient for the hydrolysis of all the alkoxy groups in the alkyl silicate to be subsequently dripped in, although a larger quantity may be used.

The monofunctional organosilicon compound is preferably a disiloxane with the formula $(R^1R^2R^3Si)_2O$ in which each $R^1$, $R^2$, and $R^3$ is a hydrogen atom or a monovalent hydrocarbon radical as exemplified by methyl, ethyl, propyl, octyl, phenyl, vinyl, and 3,3,3-trifluoropropyl). However, the monosilane with the formula $R^1R^2R^3SiX$ in which $R^1$, $R^2$, and $R^3$ are all defined as above and X is a halogen atom, alkoxy group, or hydroxyl group, for example, trialkylchlorosilane, trialkylalkoxysilane, or trialkylsilanol, can also be used as a starting material because it produces a disiloxane in aqueous hydrochloric acid.

Examples of the disiloxanes to be used are
1,1,3,3-tetramethyldisiloxane
1,1,1,3,3,3-hexamethyldisiloxane
1,1,3,3-tetramethyl-1,3-divinyldisiloxane,
1,1,3,3-tetramethyl-1,3-bis(3,3,3-trifluoropropyl)disiloxane,
1,1,3,3-tetramethyl-1,3-diethyldisiloxane,
1,1,3,3-tetramethyl-1,3-diphenyldisiloxane, and
1,3-diethyl-1,3-diphenyl-1,3-divinyldisiloxane.
However, as discussed above, monosilane can also be used which in aqueous hydrochloric acid produces disiloxane corresponding to the above. In addition, the disiloxane is not necessarily a single species of disiloxane, but as desired, a mixture of two or more species of disiloxane can be used.

An organic solvent which does not directly participate in the reaction may optionally be added to the hydrochloric acid-disiloxane mixed system (mixture) in order to dilute the reaction system or in order to provide for thorough mixing of the aqueous layer/organic layer. Examples of said organic solvents are methanol, ethanol, isopropanol, acetone, methyl ethyl ketone, benzene, toluene, and xylene.

Examples of the alkyl silicate or its partial hydrolysis condensate which is to be dripped into the above-specified mixed system are methyl orthosilicate, methyl polysilicate, ethyl orthosilicate, ethyl polysilicate, propyl orthosilicate and propyl polysilicate. The target organosilicon polymer is produced when the above alkyl silicate is dripped into the mixture of disiloxane and aqueous hydrochloric acid at 0° to 90° C. From the standpoint of obtaining good results, the reaction temperature should be as high as possible, such as from 50° to 90° C., as long as the substituents on the disiloxane are stable with respect to aqueous hydrochloric acid, because the increases the monosilane concentration. On the other hand, disiloxane such as SiH-containing 1,1,3,3-tetramethyldisiloxane should be reacted at lower temperatures such as from 0° to 35° C. because such a disiloxane decomposes with hydrogen evolution in aqueous hydrochloric acid at higher temperatures.

EXAMPLES

The present invention will be explained using demonstrational examples. The viscosity in the examples is the value measured at 25° C. Me, Vi, and Et are abbreviations for methyl, vinyl, and ethyl, respectively. % is wt % in all cases.

EXAMPLE 1

Synthesis of $(Me_3SiO_{\frac{1}{2}})_{1.0\ to\ 1.6}(SiO_{4/2})$

A mixture of 129.6 g of hexamethyldisiloxane (0.8 moles), 40 g of concentrated hydrochloric acid, 60 g of water, and 30 g of ethanol was heated to 70° C. and 208.3 g of tetraethoxysilane (1.0 mole) was dripped in over 1 hour with stirring. After the completion of addition, the polymer layer (lower layer) was washed with water and then heated at 130° C./2 mmHg to strip the low-boiling components. Filtration yielded an organosilicon polymer with a viscosity of 0.712 Pa.s in a yield of 176 g (93%).

Organosilicon polymers with $(Me_3SiO_{\frac{1}{2}})$ unit/$(SiO_{4/2})$ unit ratios of 1.4, 1.2, and 1.0 were also produced in high yields by the same method. The analytical results for these polymers are reported in Table 1.

TABLE 1

| Organosilicon polymer | Analytical Results | | | |
|---|---|---|---|---|
| | Viscosity Pa.s | Molecular weight (a) | $M_w/M_n$ (b) | Residual EtO $Me_3SiO_{\frac{1}{2}}$ molar ratio (c) |
| $(Me_3SiO_{\frac{1}{2}})_{1.6}(SiO_{4/2})$ | 0.712 | 1,100 | 1.09 | 0.07 |
| $(Me_3SiO_{\frac{1}{2}})_{1.4}(SiO_{4/2})$ | 2.380 | 1,400 | 1.10 | 0.07 |
| $(Me_3SiO_{\frac{1}{2}})_{1.2}(SiO_{4/2})$ | 15.400 | 2,000 | 1.09 | 0.08 |
| $(Me_3SiO_{\frac{1}{2}})_{1.0}(SiO_{4/2})$ | semisolid | 3,200 | 1.11 | 0.08 |

(a) number-average molecular weight as measured by vapor pressure
(b) measured by GPC
(c) measured by NMR

EXAMPLE 2

Synthesis of $(Me_3SiO_{\frac{1}{2}})_{0.7}(SiO_{4/2})$

A mixture of 72.9 g of hexamethyldisiloxane (0.35 moles), 40 g of concentrated hydrochloric acid, 60 g of water, 20 g of ethanol, and 40 g of toluene was heated to 70° C. and 208.3 g of tetraethoxysilane (1.0 mole) was dripped in with stirring. This was then worked up as described in Example 1 to obtain an organosilicon polymer softening point, 110°–120° C.; yield, 90%) with $M_w/M_n = 1.34$ and a (residual EtO group)/$(Me_3SiO_{\frac{1}{2}})$ molar ratio of 0.08.

EXAMPLE 3

Synthesis of $(HMe_2SiO_{\frac{1}{2}})_{1.82}(SiO_{4/2})$

A mixture of 480 g of 1,1,3,3-tetramethyldisiloxane (3.58 moles), 120 g of concentrated hydrochloric acid, and 200 g of water was cooled to a liquid temperature of 5° C. by ice cooling and 600 g of tetramethoxysilane (3.95 moles) was dripped in with stirring over 1.5 hours. The liquid temperature reached a maximum of 30° C. during the process. After the completion of the addition, the polymer layer (lower layer) was separated, washed with water, and then stirred at 130° C./2 mmHg for 2 hours to remove the low-boiling components. An organosilicon polymer with a viscosity of 0.0164 Pa.s was thus produced in a yield of 677 g (94%). The $M_w/M_n = 1.06$ and the (residual MeO group)/$(HMe_2SiO_{\frac{1}{2}})$ molar ratio was 0.06.

EXAMPLE 4

Synthesis of $(Me_3SiO_{\frac{1}{2}})_{0.8}(HMe_2SiO_{\frac{1}{2}})_{0.7}(SiO_{4/2})$ To a mixture of 225 g of 1,1,3,3-tetramethyldisiloxane (1.68 moles), 311 g of hexamethyldisiloxane (1.92 moles), 144 g of concentrated hydrochloric acid, 240 g of water, and 90 g of ethanol was added dropwise 730 g of tetramethoxysilane (4.8 moles) at a liquid temperature regulated to 30° C. with stirring. This was then worked up by the method described in Example 3 to obtain 767 g (93% yield) of an organosilicon polymer (viscosity, 0.080 Pa.s) containing 0.38% Si-H groups (theoretical value, 0.41%), with $M_w/M_n = 1.08$, and in which the (MeO group)/$(Me_3SiO_{\frac{1}{2}} + HMe_2SiO_{\frac{1}{2}})$ molar ratio was 0.06.

EXAMPLE 5

Synthesis of $(ViMe_2SiO_{\frac{1}{2}})_2(SiO_{4/2})$

To a mixture of 167.4 g of 1,3-divinyl-1,1,3,3-tetramethyldisiloxane (0.9 moles), 30 g of concentrated hydrochloric acid, 50 g of water, and 30 g of ethanol was added dropwise 187.5 g of tetraethoxysilane (0.9 moles) at 70° C. with stirring over 1 hour. The polymer product was washed with water and taken up in toluene and this was heated under reflux to remove water azeotropically. 10 mg potassium hydroxide was then added and this was again heated under reflux for dehydration condensation of silanol in the polymer, followed by neutralization with carbon dioxide gas. The toluene was then distilled and the low-boiling components were removed at 110° C./3 mmHg for 2 hours to obtain the target organosilicon polymer with a viscosity of 0.108 Pa.s in a yield of 208 g (94% yield) with $M_w/M_n = 1.10$ while EtO groups were essentially not detected.

EXAMPLE 6

Synthesis of $(Me_3SiO_{\frac{1}{2}})_{1.38}(ViMe_2SiO_{\frac{1}{2}})_{0.42}(SiO_{4/2})$ A stirred mixture of 156 g of 1,3-divinyl-1,1,3,3-tetramethyldisiloxane (0.84 moles), 447 g of hexamethyldisiloxane (2.76 moles), 120 g of concentrated hydrochloric acid, 200 g of water, and 120 g of ethanol was heated to 70° C. and 833 g of tetraethoxysilane (4 moles) was dripped in over 2 hours. This was then worked up by the method described in Example 5 to obtain 783 g (93% yield) of an organosilicon polymer with a viscosity of 0.370 Pa.s in which the vinyl group content was 5.2% (theoretical value, 5.4%), $M_w/M_n = 1.10$ and EtO groups was essentially not detected.

EXAMPLE 7

Synthesis of $(Me_3SiO_{\frac{1}{2}})_{0.8}(SiO_{4/2})$

A mixture of 64.8 g of hexamethyldisiloxane (0.5 moles), 30 g of concentrated hydrochloric acid, 50 g of water, 20 g of ethanol, and 40 g of toluene was heated to 70° C. and 150 g of Silicate 40 (ethylpolysilicate containing 40% $SiO_2$ fraction) was dripped in with stirring. This was then worked up by the method described in Example 1 to obtain an organosilicon polymer in a yield of 93% (softening point, 70° to 80° C.) in which $M_w/M_n = 1.28$ and the (residual EtO group)/$(Me_3SiO_{\frac{1}{2}})$ molar ratio was 0.08.

EXAMPLE 8

76 grams (0.7 mole) of trimethylchlorosilane was admixed with 100 grams of water solution which was 5 weight percent hydrochloric acid and which was cooled by ice. Into the resulting mixture heated to 60° C., 208.3 grams (1 mole) of tetraethoxysilane was dripped with agitation. The resulting product was extracted from the aqueous mixture with toluene. The toluene-product mixture was washed with water and then the toluene was stripped off. The resulting solid product (100 grams, yield of 90% by weight) was a copolymer of trimethylsiloxy units and $SiO_2$ units. This copolymer had a softening point of 110°–120° C., $M_w/M_n$ was 1.30, and the mole ratio of EtO radicals/$Me_3SiO_{0.5}$ units was 0.08. Comparative Example 2 used the same materials, but the method used was the method taught by Goodwin in U.S. Pat. No. 2,857,346.

COMPARISON EXAMPLE 1

Water glass JIS no. 3 was diluted two-fold with water and then dripped into hydrochloric acid present in a quantity twice the quantity theoretically necessary to neutralize the water glass. Silicic acid oligomer was thus produced. The produced silicic acid oligomer was added to a mixture of a large excess of disiloxane, hydrochloric acid and isopropyl alcohol to synthesize an organosilicon polymer which was then extracted with toluene, washed with water, and stripped. The resulting organosilicon polymer (96% yield based on water glass) was a solid which did not have a softening point and for which $M_w/M_n = 1.9$.

COMPARISON EXAMPLE 2

100 g of water was dripped into a mixture of 208.3 g of tetraethoxysilane (1 mole) and 76 g of trimethylchlorosilane (0.7 moles) regulated to 60° C. with stirring. The polymer product was extracted with toluene, washed with water, and then stripped to obtain a solid organosilicon polymer in a yield of 109 g (93%) with a softening point of 30° C. in which $M_w/M_n = 1.09$ and in which the (residual EtO group)/$(Me_3SiO_{\frac{1}{2}})$ molar ratio was 0.24.

Effects of the Invention

As discussed above, the method of the present invention provides for the unrestricted, highly reproducible production of an organosilicon polymer with a three-dimensional structure of monofunctional siloxane units and tetrafunctional siloxane units. The polymer's average molecular weight will have the target value and the molecular weight distribution will be narrow, neither of which could be accomplished heretofore. For this reason, said organosilicon polymer is very useful as a tack agent, coating agent, polymer additive, sealant for electric and electronic parts, elastomer, fiber treatment agent, etc., while its application is to be anticipated in a broad range of prior applications and in applications in new fields.

That which is claimed is:

1. A method for producing organosilicon polymer having a general average formula $$(R^1R^2R^3SiO_{\frac{1}{2}})_a(SiO_{4/2})_b$$

in which each $R^1$, $R^2$, and $R^3$ is a hydrogen atom or a monovalent hydrocarbon radical and the ratio of a/b is from 0.2/1 to about 4/1 comprising dripping an alkyl silicate selected from the group consisting of alkyl orthosilicate and its partial hydrolysis condensate into a mixture of aqueous hydrochloric acid containing at least 5 weight percent hydrogen chloride and an organosilicon compound selected from the group consisting of a disiloxane of the formula $$(R^1R^2R^3Si)_2O,$$

an organosilane of the formula $$R^1R^2R^3SiX,$$

and mixtures thereof in which $R^1$, $R^2$, and $R^3$ are defined above and X is a group selected from the group consisting of a halogen atom, an alkoxy group, and a hydroxyl group at a temperature of from 0° to 90° C. with stirring.

2. The method in accordance to claim 1 further comprising removing the low boiling components.

3. The method in accordance to claim 2 in which the low boiling components are removed by heating at reduced pressure.

4. The method in accordance to claim 1 further comprising an organic solvent present in the mixture.

5. The method in accordance to claim 4 further comprising removing the low boiling components.

6. The method in accordance to claim 5 in which the low boiling components are removed by heating at reduced pressure.

7. The method in accordance to claim 1 in which the aqueous hydrochloric acid contains at least 10 weight percent hydrogen chloride.

8. The method in accordance to claim 6 in which the aqueous hydrochloric acid contains at least 10 weight percent hydrogen chloride.

9. The method in accordance to claim 1 in which the organosilicon compound is a disiloxane.

10. The method in accordance to claim 7 in which the organosilicon compound is a disiloxane.

11. The method in accordance to claim 8 in which the organosilicon compound is a disiloxane.

12. The method in accordance to claim 11 in which the disiloxane is hexamethyldisiloxane, the aqueous hydrochloric acid is concentrated hydrochloric acid, the alkyl silicate is selected from the group consisting of ethyl polysilicate and tetraethoxysilane, the organic solvent is selected from the group consisting of ethanol and a mixture of ethanol and toluene, the mixture is heated to 50° to 90° C. before the tetraethoxysilane is dripped into it, and the ratio of $$(CH_3)_3SiO_{\frac{1}{2}} \text{ to } SiO_{4/2}$$

is from 1/1 to 1.6/1.

13. The method in accordance to claim 12 in which the alkyl silicate is tetraethoxysilane and the organic solvent is ethanol.

14. The method in accordance to claim 12 in which the alkyl silicate is ethyl polysilicate and the organic solvent is a mixture of ethanol and toluene.

15. The method in accordance to claim 12 in which the alkyl silicate is tetraethoxysilane and the organic solvent is a mixture of ethanol and toluene.

16. The method in accordance to claim 10 in which the alkyl silicate is tetramethoxysilane, the aqueous hydrochloric acid is concentrated hydrochloric acid, the disiloxane is 1,1,3,3-tetramethyldisiloxane, the mixture is at a temperature of from 0° to 35° C., and the ratio of $$H(CH_3)_2SiO_{\frac{1}{2}} \text{ to } SiO_{4/2}$$

is from 1.5/1 to 2/1.

17. The method in accordance to claim 11 in which the alkyl silicate is tetramethoxysilane, the aqueous hydrochloric acid is concentrate hydrochloric acid, the disiloxane is a mixture of hexamethyldisiloxane and 1,1,3,3-tetramethyldisiloxane, the organic solvent is ethanol, the mixture is at a temperature of from 0° to 35° C., the ratio of $(CH_3)_3SiO_{\frac{1}{2}} + H(CH_3)_2SiO_{\frac{1}{2}}$ to $SiO_{4/2}$ is from 1/1 to 2/1, and the amount of silicon bonded hydrogen atom is from 0.05 to 1 weight percent based on the weight of the polymer.

18. The method in accordance to claim 11 in which the alkyl silicate is tetraethoxysilane, the aqueous hydrochloric acid is concentrated hydrochloric acid, the disiloxane is 1,3-vinyl-1,1,3,3-tetramethyldisiloxane, the organic solvent is ethanol, the mixture is at a temperature of from 50° to 90° C., the ratio of $(CH_2=CH)(CH_3)_2SiO_{\frac{1}{2}}$ to $SiO_{4/2}$ is from 1/1 to 3/1.

19. The method in accordance to claim 10 in which the alkyl silicate is tetraethoxysilane, the aqueous hydrochloric acid is concentrated hydrochloric acid, the disiloxane is a mixture of hexamethyldisiloxane and 1,3-vinyl-1,1,3,3-tetramethyldisiloxane, the organic solvent is ethanol, the mixture is at a temperature of from 50° to 90° C., the ratio of $(CH_2=CH)(CH_3)_3SiO_{\frac{1}{2}} + (CH_3)_3SiO_{\frac{1}{2}}$ to $SiO_{4/2}$ is from 1/1 to 2/1, and the vinyl content is from 0.1 to 10 weight percent based on the weight of the polymer.

20. The composition obtained from the method of claim 1.

21. The composition obtained from the method of claim 2.

22. The composition obtained from the method of claim 4.

23. The composition obtained from the method of claim 6.

24. The composition obtained from the method of claim 12.

25. The composition obtained from the method of claim 16.

26. The composition obtained from the method of claim 18.

27. The composition obtained from the method of claim 19.

* * * * *